(12) United States Patent
Novotny

(10) Patent No.: US 7,606,475 B2
(45) Date of Patent: Oct. 20, 2009

(54) HEAT GENERATION SYSTEM

(76) Inventor: Steve Novotny, P.O. Box 1196, Frisco, CO (US) 80443

( * ) Notice: Subject to any disclaimer, the term of this patent is extended or adjusted under 35 U.S.C. 154(b) by 127 days.

(21) Appl. No.: 11/167,885

(22) Filed: Jun. 27, 2005

(65) Prior Publication Data

US 2006/0291837 A1  Dec. 28, 2006

Related U.S. Application Data

(60) Provisional application No. 60/689,690, filed on Jun. 10, 2005.

(51) Int. Cl.
*F24H 1/10* (2006.01)
(52) U.S. Cl. ........................ 392/478; 392/469
(58) Field of Classification Search ........................ None
See application file for complete search history.

(56) References Cited

U.S. PATENT DOCUMENTS

| | | | | |
|---|---|---|---|---|
| 3,604,893 A | * | 9/1971 | Horton | 392/478 |
| 3,617,699 A | * | 11/1971 | Othmer | 392/469 |
| 3,975,617 A | * | 8/1976 | Othmer | 392/469 |
| 3,983,360 A | * | 9/1976 | Offermann | 392/469 |
| 4,142,093 A | * | 2/1979 | Offermann | 392/469 |
| 4,617,449 A | * | 10/1986 | Weitzel et al. | 392/469 |
| 4,878,332 A | | 11/1989 | Drake | |
| 5,061,835 A | * | 10/1991 | Iguchi | 219/630 |
| 5,126,037 A | | 6/1992 | Showalter | |
| 5,256,844 A | * | 10/1993 | Grosvik et al. | 219/629 |
| 5,713,864 A | * | 2/1998 | Verkaart | 604/113 |
| 6,157,777 A | * | 12/2000 | Banks et al. | 392/480 |
| 6,721,497 B2 | * | 4/2004 | Gruzdev et al. | 392/485 |
| 6,770,853 B2 | | 8/2004 | Krieger et al. | |
| 7,190,892 B2 | * | 3/2007 | Kertesz | 392/480 |
| 2001/0005646 A1 | | 6/2001 | Ness et al. | |
| 2002/0122664 A1 | * | 9/2002 | Mjelstad et al. | 392/478 |

* cited by examiner

*Primary Examiner*—Thor S Campbell

(57) ABSTRACT

A system is disclosed for generating heat for the purpose of radiating such heat into a separate entity such as a residential housing structure or a pavement surface. The system includes a steel conduit positioned proximate the separate entity to be heated. An annular copper conductor element in the form of a continuous loop is disposed within the interior of the steel conduit to form a substantially contiguous contact surface between the conductor element and the interior surface of the conduit. A power supply member provides an alternating current of approximately 240-480 V, and a transformer is electrically connected to the power supply member for receiving this alternating current. The transformer has a pair of low voltage bushings each secured, respectfully, to one end of the continuous conductor element thereby passing a low voltage AC current through said conductor element to create a low voltage differential between the conductor ends to generate heat along the contiguous contact surface from a fluctuating magnetic field.

7 Claims, 3 Drawing Sheets

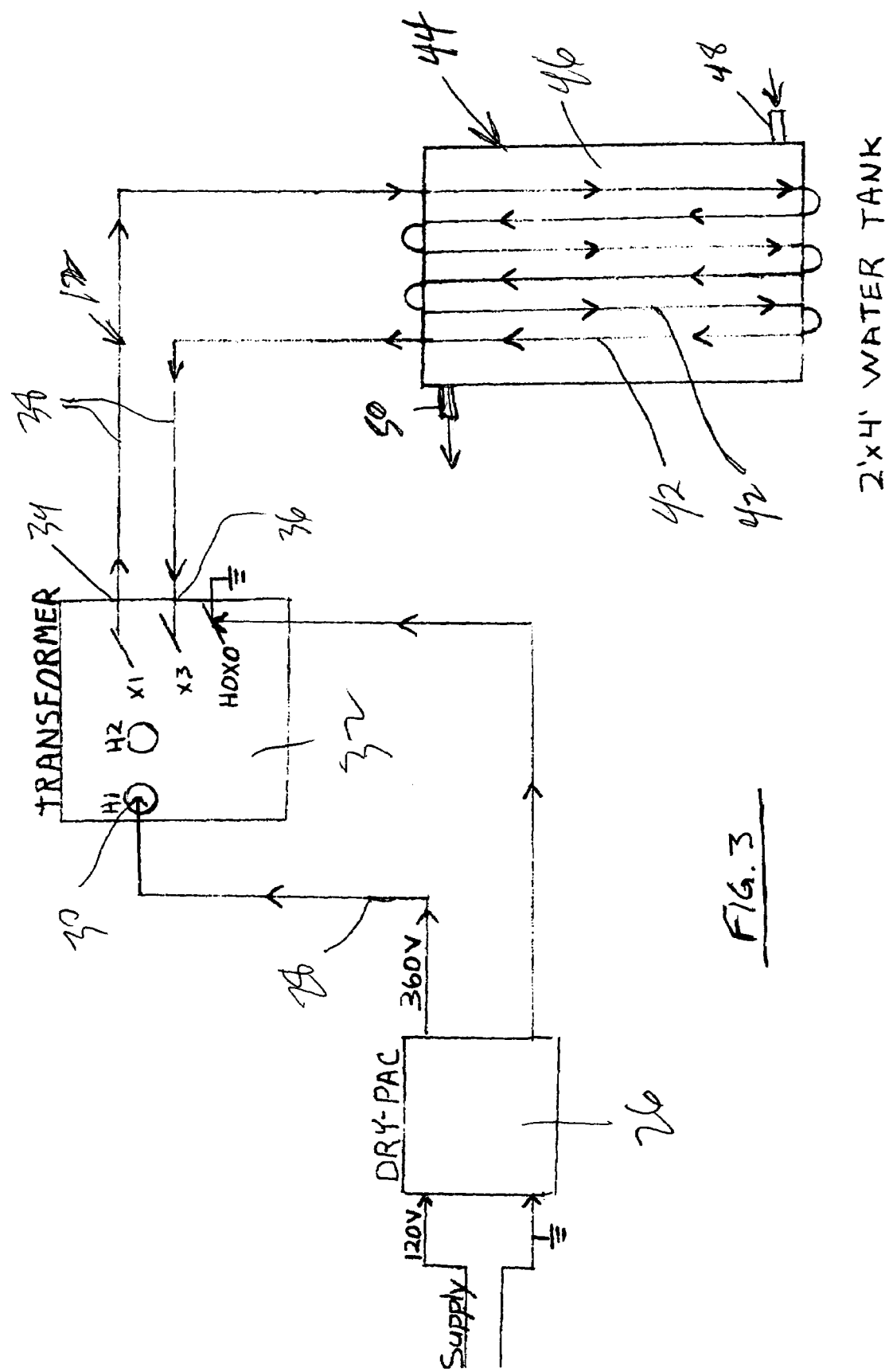

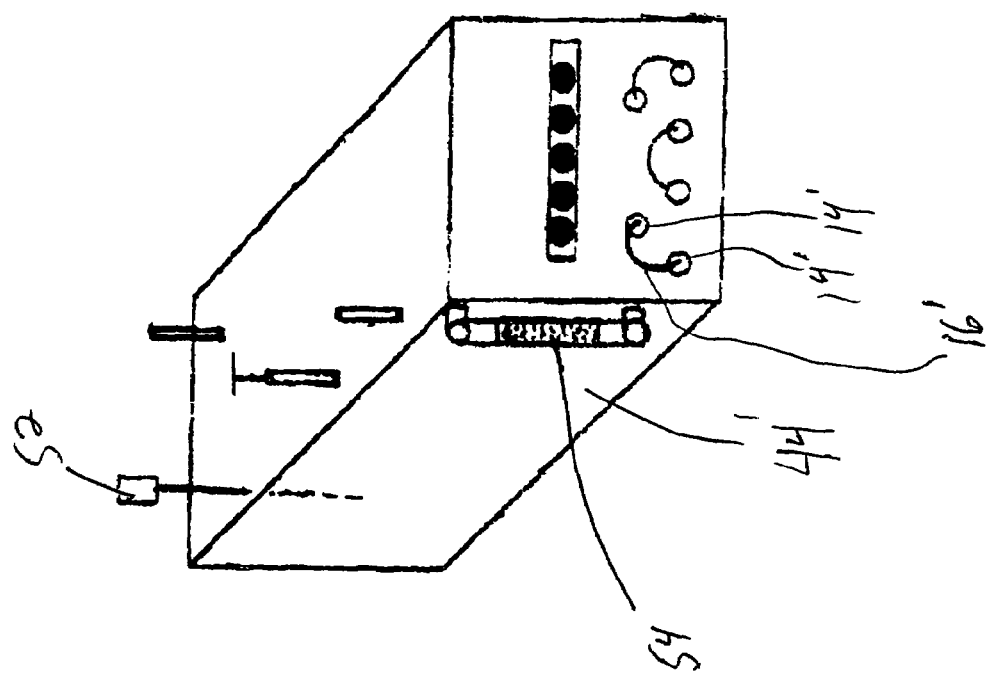

HEAT GENERATION SYSTEM

RELATED APPLICATION

This application is related to pending U.S. provisional patent application Ser. No. 60/689,690, filed Jun. 10, 2005.

BACKGROUND OF THE INVENTION

1. Field of the Invention

This invention relates generally to systems for generating heat and, more particularly, to systems for generating heat for the purpose of transfer to a body or entity requiring such heat. Specifically, the present invention relates to a low energy system for generating heat useful as a hot water source for residential heating or for the heating of exposed exterior surfaces such as sidewalks and driveways.

2. Description of the Prior Art

It is well known to utilize resistance heating coils and other systems in conjunction with pipes designed to convey liquids, such as in oil pipelines and the like. These systems are designed to typically provide a wire wrap in or around the pipeline to heat the liquids within the pipes to thereby insure that the liquid viscosity remains at a desired level for transport. Systems such as this are disclosed in U.S. Pat. No. 3,617,699 and U.S. Pat. No. 5,126,037, and U.S. patent application publication No. US 2001/0005646.

In heating the interiors of buildings, several conventional heating methods are frequently employed including hot water baseboard and forced air heating. Typically, these installations include the use of large water piping or air ducts. Moreover, hot water systems typically employ large water storage containers wherein the water is heated by gas burners or solar panels and then circulated throughout the building structure. Alternatively, electric power in the form of electric resistance cables may be used to heat the water in such storage containers.

In still another application, electric heating cables have been employed to heat the exterior surfaces of cement slabs as well as interior residential wall surfaces. An example of this type of installation is illustrated in U.S. Pat. No. 4,878,332. In these instances, resistance cables are used to radiate heat to the desired surface. Unfortunately, such resistance cables along with the systems discussed above utilize a significant amount of electrical or gas energy to generate the desired and/or required heat.

Therefore, there remains a need in the art for such a heating device or system for residential structures as well as exterior surfaces such as cement slabs that is inexpensive to install as well as inexpensive to operate by being an energy efficient device, and the present invention addresses and solves these particular problems in the art.

SUMMARY OF THE INVENTION

Accordingly, it is one object of the present invention to provide a system designed for generating heat.

It is another object of the present invention to provide an energy efficient system for generating heat for use in heating exterior surfaces such as sidewalks and driveways to remove ice and snow therefrom.

Yet another object of the present invention is to provide an energy efficient system to heat water for use in residential hot water heating systems.

Still another object of the present invention is to provide a system designed to generate heat using magnetic flux caused by short circuit reaction resulting from low energy AC current passing through two different conductor materials.

To achieve the foregoing and other objects and in accordance with the purpose of the present invention, as embodied and broadly described herein, a system is disclosed for generating heat for the purpose of radiating such heat into a separate entity such as a residential housing structure or a pavement surface. The system includes a steel conduit positioned proximate the separate entity to be heated. An annular copper conductor element in the form of a continuous loop is disposed within the interior of the steel conduit to form a substantially contiguous contact surface between the conductor element and the interior surface of the conduit. A power supply member provides an alternating current of approximately 240-480 V, and a transformer is electrically connected to the power supply member for receiving this alternating current. The transformer has a pair of low voltage output bushings each secured, respectfully, to an end of the continuous conductor element thereby passing a low voltage AC current through said conductor element to create a low voltage differential between the output bushings and conductor ends to generate heat along the contiguous contact surface from a fluctuating magnetic field.

In one modification of the invention, the conductor element of the system comprises a 2/0 copper wire. In another aspect of the invention, the power supply is in the form of a 120 volt AC dry-pac power source adapted to boost this AC current to approximately 240-360 V.

In another modification, the transformer is in the form of an oil-filled transformer adapted to produce approximately an 8 V differential across the transformer output bushings to create a fluctuating magnetic field along the conduit to generate heat therein. In one aspect of this, the power supply and the transformer are integrated into one device.

In yet another specific modification of the invention, the conduit includes a ½ inch diameter steel pipe, and the conductor is in the form of a 2/0 stranded and insulated copper element filling the interior of the ½ inch pipe.

In another modification, the separate entity to be heated by the system of the invention is an artificial surface structure selected from the group consisting of concrete, cement and asphalt. In this arrangement, the conduit is buried in the structure immediately below the outer surface thereof for heating the outer surface. In an alternative form of this modification, the separate entity to be heated by the system of the invention is a tank adapted to contain water. In this arrangement, the tank has a water inlet and a water outlet, and the conduit is in the form of a plurality of spaced loops within the tank interior to heat the water as it passes through the tank. In one form of this arrangement, the tank is disposed in a residential structure, and the tank inlet and outlet are attached to a closed residential hot water heating system.

In yet another modification of the invention, a hot water heating system is provided and includes a container for holding water therein. The container includes a fluid inlet end element and a fluid outlet end element. A steel conduit in the form of a plurality of spaced conduit loops is positioned within the container and is adapted to enable water in the container to flow therebetween. A continuous annular copper conductor element is disposed within the interior of the steel conduit loops to form a substantially contiguous contact surface between the conductor element and the interior surface of the conduit loops. A power supply member provides an alternating current of approximately 120 V. A first transformer is electrically connected to the power supply member for boosting the current to approximately 240-360 V. A second transformer is preferably provided for receiving the boosted alternating current. The second transformer has a pair of low voltage output bushings each secured, respectfully, to one end of the conductor element for passing an AC current through the conductor element to create a low voltage differential between the output bushings and conductor ends to create a fluctuating magnetic field along the conduit and thereby generate heat along the contiguous contact surface.

Another modification and aspect of the invention includes a method for generating heat for residential and ground surface applications. The method includes the steps of placing a steel conduit in the form of a plurality of spaced conduit loops adjacent an entity to receive heat. A continuous annular copper conductor element is then positioned snugly within the interior of the steel conduit loops to form a substantially contiguous contact surface between the conductor element and the interior surface of the conduit loops. A power supply member is provided to generate an alternating current of approximately 120 V. The power supply member is electrically connected to a first transformer to boost the current to approximately 240-360 V therefrom. A second transformer is then provided for receiving the boosted alternating current. Each of a pair of low voltage output bushings on the second transformer is connected to, respectively, one end of the conductor element for passing an AC current through the conductor element to create a low voltage differential between the conductor ends at the output bushings. Finally, a fluctuating magnetic field is created along the conduit to thereby generate heat along the contiguous contact surface of the conduit to heat the entity adjacent thereto.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings:

FIG. 3 is a schematic of an alternate system constructed in accordance with the present invention for use in heating hot water; and FIG. 4 is a front perspective of a device incorporating the system of the present invention for heating water used in a home heating system.

DETAILED DESCRIPTION OF THE EXEMPLARY EMBODIMENTS

Figure 1:
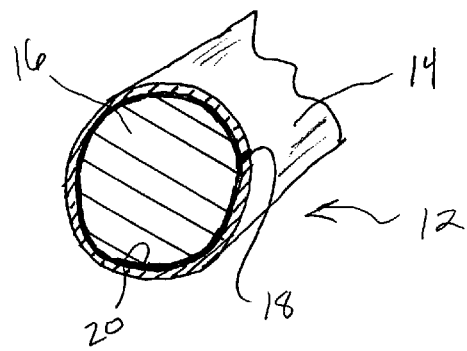
FIG. 1 is front perspective of one embodiment of an electrical conduit useful in the system of the present invention.
Figure 2:
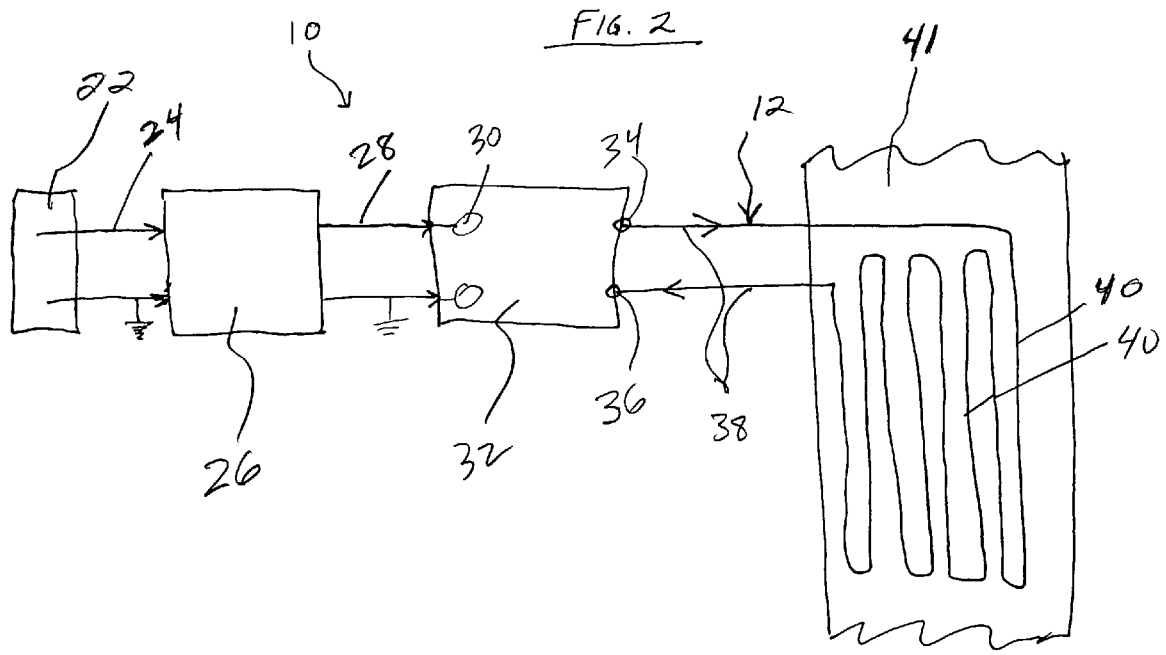
FIG. 2 is a schematic of one system constructed in accordance with the present invention for use in heating an exterior surface member.

Referring first to FIGS. 1 and 2, the present invention is a system 10 useful in generating heat for a myriad of uses. Examples of such heating uses preferably include hot water systems for use in heating residences, heating exterior surfaces such as sidewalks and driveways to melt ice and snow, heating interior room floors and walls, and the like. A key element to this system 10 is the application of an AC current along a conduit member 12. The AC current is not used to generate heat itself, but rather to create a magnetic flux reaction along the conduit member 12 which in turn generates heat. More specifically, the conduit member 12 includes a steel conduit or pipe 14 having an inner annular conductor element 16 comprising copper. In preferred form, the steel conduit or pipe 14 may be black or galvanized steel and is approximately one-half inch in diameter, although other appropriate types and sizes of steel conduit may be utilized in the present invention. The inner conductor element 16 is preferably in the form of a 2/0 solid copper wire or a 2/0 stranded and insulated copper conduit.

A key to the operation of the conduit member 12 is that the conductor element 16 be substantially copper or at least include sufficient copper to create the desired effect. The element 16 is preferably sized to snugly fit within the interior annular opening of the conduit 14 so that the outer surface 18 of the copper conductor element 16 is substantially contiguous in contact with the inner surface 20 of the pipe 14. The pipe 14 may be in one continuous loop or may be sectioned with the conduit element 16 in one continuous loop positioned therein and between the sections of pipe 16. In this manner, the AC current, as described below, which is directed through the conductor element 16 causes a magnetic flux as a result of the electrical reaction between the copper and the steel. The positive and negative molecular movement in the steel conduit 12 as a result of the AC current creates significant heat radiation, which is then utilized as described below.

Referring particularly to FIG. 2, in one preferred form of the invention an AC power supply 22 of standard design is provided to generate an AC current of approximately 120 volts. The 120 volt AC current 24 is then directed to a first transformer 26 which is preferably a dry-pac type transformer. The transformer 26 boosts the AC current output 28 therefrom to approximately 240-480 volts. This output voltage 28 is then applied to a high voltage bushing 30 of a second transformer 32. In preferred form, the second transformer 32 is an oil-filled transformer that includes a pair of output bushings 34, 36. As a result of the winding ratio of the transformer 32, this arrangement results in approximately 8 volts across the low-voltage bushings 34, 36.

A continuous run 38 of the conduit member 12 interconnects the copper conductor element 16 thereof with the first low voltage bushing 34 and the second low voltage bushing 36. When this is accomplished, a magnetic field builds and collapses approximately 120 times per second. Consequently, the molecules in the metal pipe 14 attempt to change polarity in step with the fluctuating increasing and decreasing of the magnetic field. This activity in turn produces heat in the steel pipe 14, thus heating the area surrounding the conduit member 12. In the illustrated embodiment of FIG. 2, the continuous run 38 of the conduit member 12 is in the form of a plurality of loops 40 which are spaced from each other and embedded in a concrete, cement or asphalt slab 41. The concrete slab 41 may represent a sidewalk, a driveway or any other similar structure. Consequently, the heat radiated from the conduit member 12 heats the upper surface of the slab 41 thereby melting any snow or ice which may accumulate thereon during the wintertime. Similarly, the slab 41 may be in the form of a residential interior wall or floor, and the heat radiated from the conduit member 12 would emanate into the surrounding air space thus heating the residence interior.

In an alternate form, the system 10 may be portable for use on a concrete slab 41 to provide a ground heating system. In this embodiment, the conduit loops 40 are placed on top of the slab 41. A thin insulated blanket (not illustrated) is then placed over the conduit loops 40 to thaw the ground slab 41.

Referring now to FIG. 3, an alternative embodiment is illustrated therein. In this embodiment, the transformer 26 generates an output AC current 28 of approximately 360 volts which in turn is directed to the high voltage bushing 30 of the second transformer 32. In preferred form, the second transformer 32 is also an oil-filled transformer that includes a pair of output bushings 34, 36 as a result of the winding ratio of the transformer 32. This arrangement also results in approximately 8 volts across the low-voltage bushings 34, 36. In this embodiment, the continuous run 38 of the conduit member 12 is preferably in the form of a plurality of loops 42. In this embodiment, the loops 42 pass through a water tank 44 which contains water 46. The tank 44 includes a water inlet 48 and a water outlet 50. The water 46 passes through and around the loops 42 within the tank 44 so as to absorb the heat being generated by conduit member 12. Once the water has traversed the length of the tank 44, the heated water exits outlet 50 and is then directed to a desired end use. In one particular preferred embodiment, this use is for the heating of a typical residence. As a result, the hot water tank 44 provides heat for hot water baseboard heating of such a residence.

Referring now to FIG. 4, an alternate embodiment is illustrated for use with the present invention in heating a residential unit. In this particular embodiment, a water tank 44' is illustrated. The remaining components of FIG. 3 are applicable to this embodiment of FIG. 4. In this particular embodiment, the tank 44' includes a plurality, and preferably six, of spaced and substantially parallel pipe elements 14'. A continuous loop of an inner annular conductor element 16' comprising copper is threaded back and forth through the pipe elements 14'. In this particular embodiment, the tank 44' is approximately 2 ft. by 2 ft. by 4 ft. to create approximately 32 ft.$^3$ of water storage for about 103 gal. of heated water to heat a residential unit. A temperature sensor 52 is preferably provided to monitor the water temperature within the tank 44', while a sight glass device 54 is provided to physically observe the water level within the tank 44'. In addition, water entering the storage tank 44' may be selectively preheated before entering the tank 44'.

The above system as particularly illustrated in FIGS. 3 and 4 was first tested using only a 120 volt total input. This arrangement was ineffective for generating sufficient magnetic flux in the conduit member to create adequate heat. As a result, the dry-pac dry transformer 26 was added to the system 10 to step up the voltage to either 240 volts, 360 volts or 480 volts AC. A 240-volt output was then selected, and this arrangement produced more heat than the system 10 without the dry-pac transformer. However, it was still not adequate for rapid recovery of water temperature. The next test performed utilized a 360-volt AC output. This arrangement produced high heat in the conduit member 12 very efficiently while maintaining even water temperature in the tank 44' with constant water circulation therein. A final test was then performed utilizing a 480-volt output, and this produced even more rapid heating in the conduit member 12. However, with this larger voltage, larger wires and breakers were required in the system 10. Although this option is available for larger and commercial applications of the system of the present invention, it was discovered that a 360-volt output to the oil-filled transformer 32 was the optimal choice for most residential hot water heating applications.

As a result of the present invention, a hot-water home heating system can be provided for less than one dollar per day energy usage, i.e. approximately $0.12 per hour. This is a significant energy savings compared to existing systems, whether those systems are electric or gas hot-water based heating arrangements. Consequently, the present invention provides a highly efficient and effective system for generating heat. In particular, the heat may be diverted for purposes of warming exterior surfaces of sidewalks or driveways to remove ice and snow therefrom. In addition, the present invention represents a unique system for heating hot water for use in residential hot water heating arrangements which presents significant energy savings as compared to any existing system presently available both at a residential as well as a commercial level. The present invention is powered by an electrical source, although the electrical source is not directly utilized for the heating effect. The present invention takes advantage of magnetic flux caused by differential metal contact when exposed to alternating current, and the result is a highly efficient heating mechanism with remarkably low energy usage.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A system for generating heat for the purpose of radiating heat into a separate entity, said system comprising:
    a steel conduit positioned proximate the separate entity to be heated;
    an annular copper conductor element in the form of a continuous loop disposed within the interior of said steel conduit to form a contiguous contact surface between the outer surface of said conductor element and the interior surface of said conduit;
    a power supply member for providing an alternating current of approximately 240-480 V;
    a transformer electrically connected to said power supply member for receiving said alternating current; and
    said transformer having a pair of low voltage output bushings each secured, respectfully, to one end of said copper conductor element for passing a low voltage AC current through said conductor element to create a fluctuating magnetic field along said conduit to generate heat along said contiguous contact surfaces between said conductor element and said conduit.

2. The system as claimed in claim 1, wherein a thin insulated blanket is removably disposed over said conductor containing conduit.

3. The system as claimed in claim 1, wherein said power supply comprises a 120 V. AC dry-pac power source adapted to boost said AC current to approximately 240-360 V.

4. The system as claimed in claim 3, wherein said transformer comprises an oil filled transformer adapted to produce approximately an 8 V differential across said transformer output bushings to create a fluctuating magnetic field along said conduit to generate heat therein.

5. The system as claimed in claim 4, wherein said power supply and said transformer are integrated into one device.

6. The system as claimed in claim 1, wherein said conduit comprises a ½ inch diameter steel pipe, and said conductor comprises a 2/0 stranded and insulated copper element filling the interior of said pipe.

7. The system as claimed in claim 1, wherein the separate entity to be heated by said system comprises an artificial surface structure selected from the group consisting of concrete, cement and asphalt, said conduit being buried in said structure immediately below the outer surface thereof for heating said outer surface.

* * * * *